R. CROMPTON.
FILLING REPLENISHING MECHANISM FOR LOOMS.
APPLICATION FILED FEB. 21, 1914.

1,276,180.

Patented Aug. 20, 1918.
9 SHEETS—SHEET 1.

Witnesses:
Horace A. Crossman
Carl L. Choate

Inventor:
Randolph Crompton
by Emery, Booth, Janney & Varney
Attys.

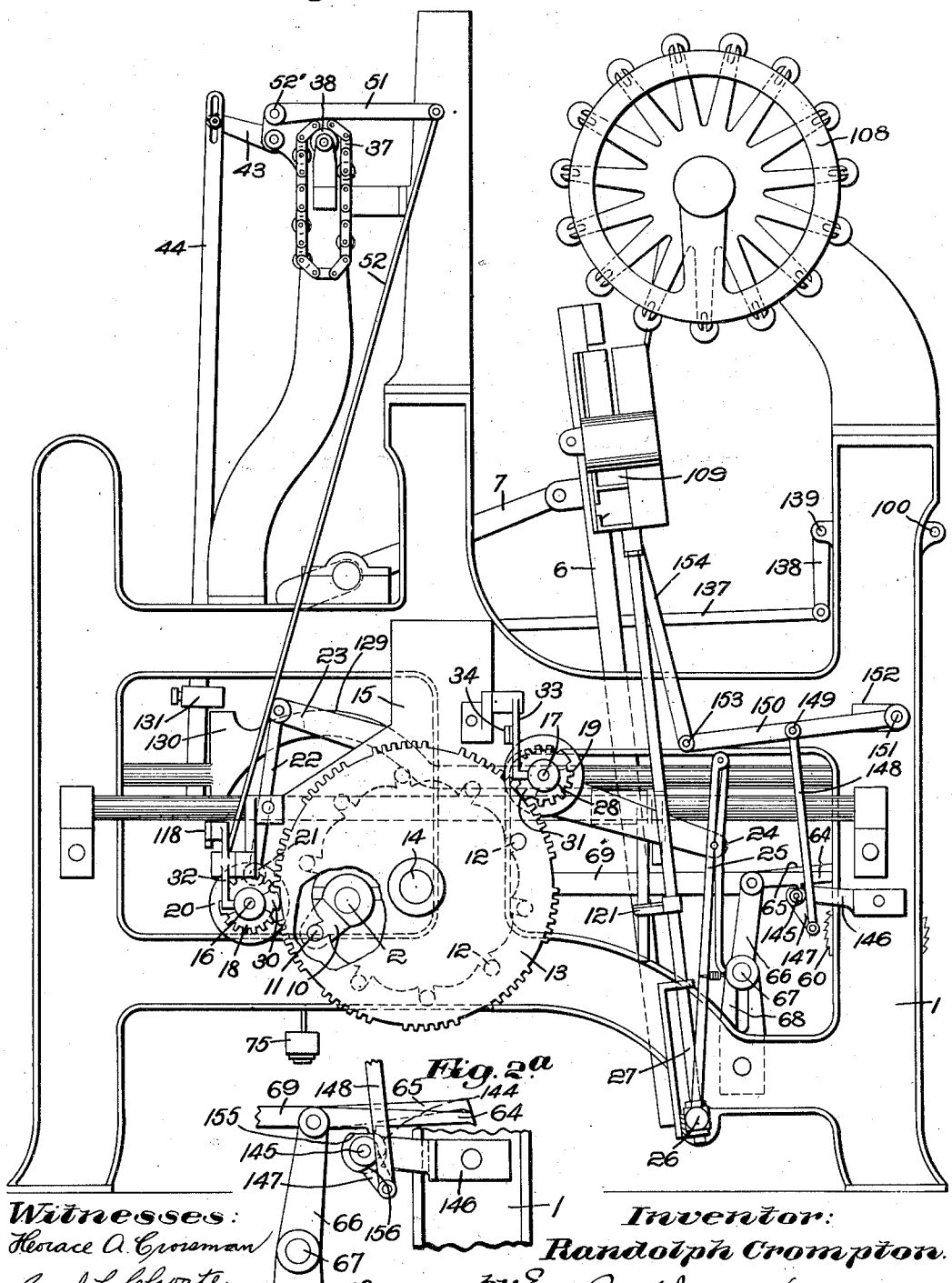

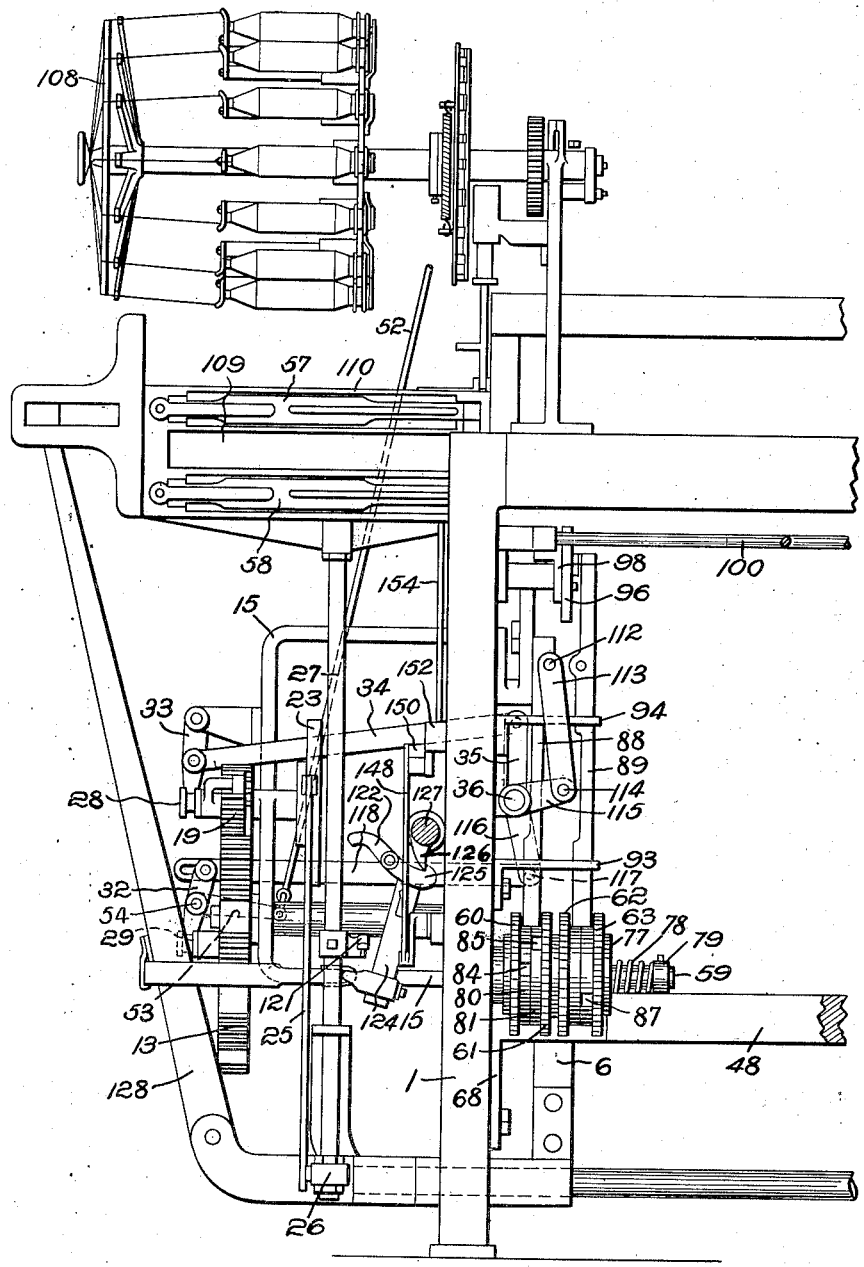

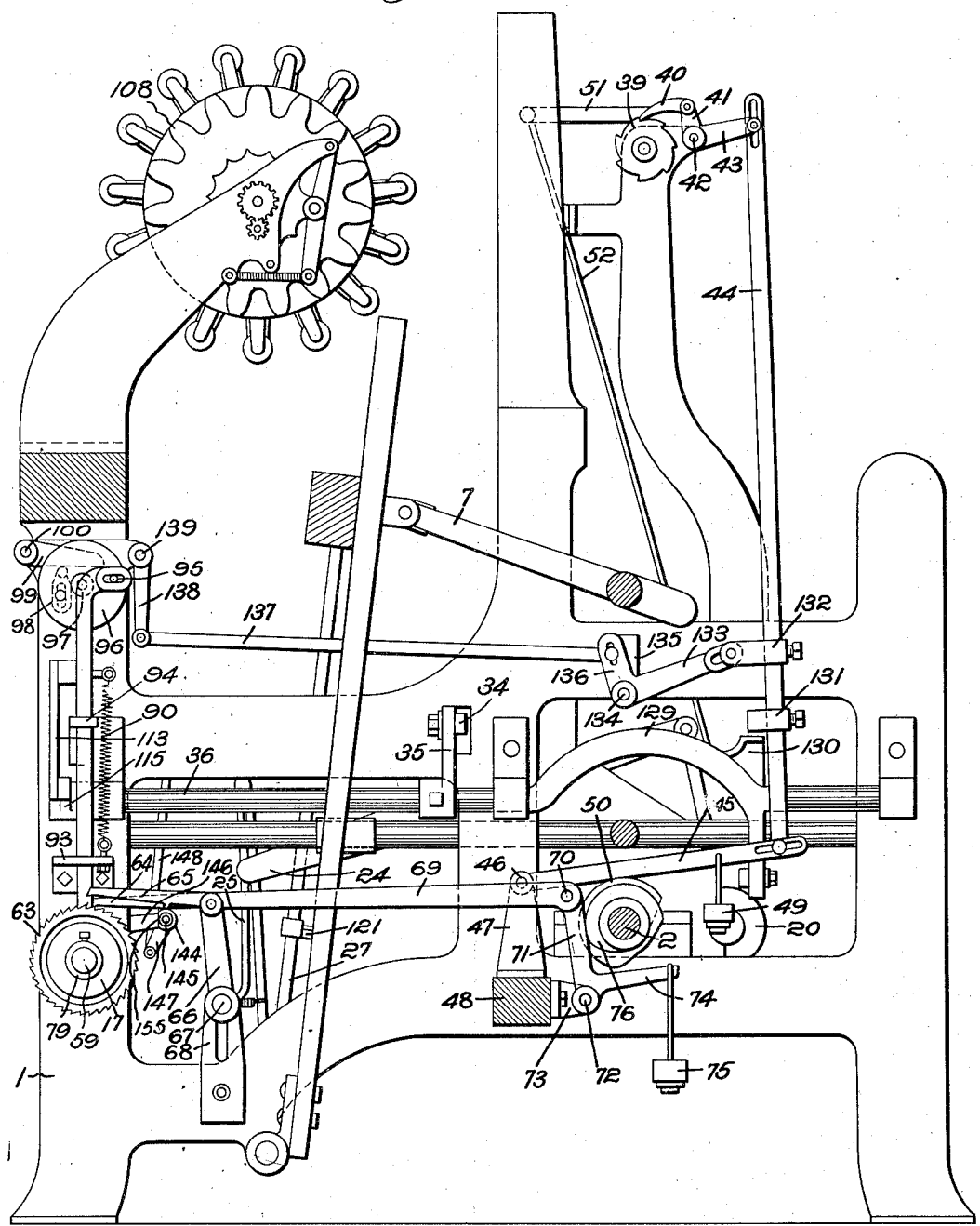

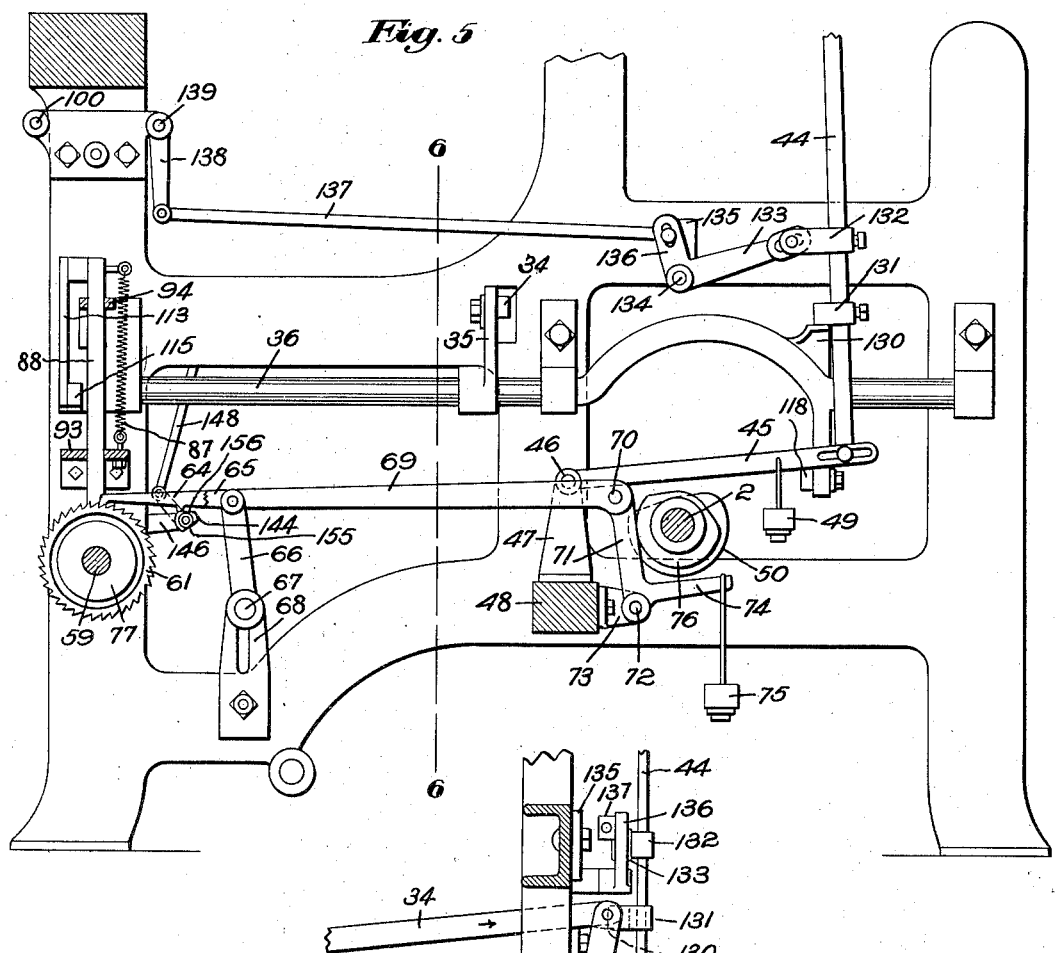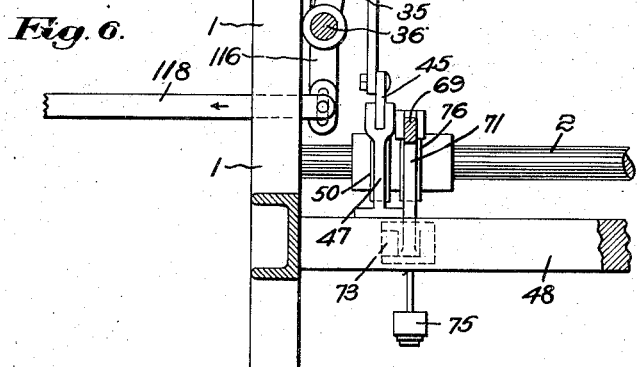

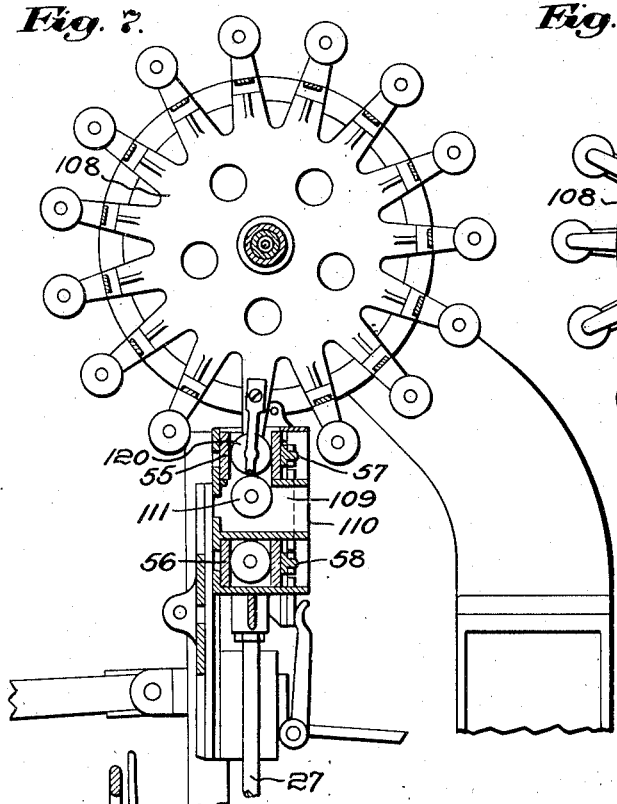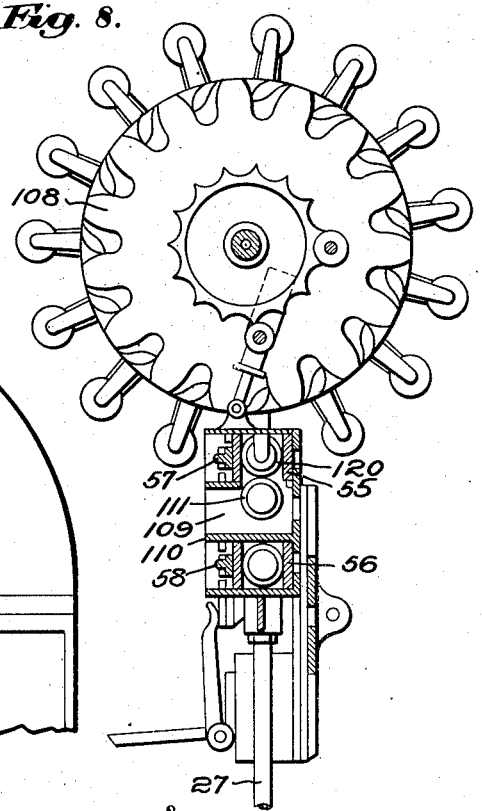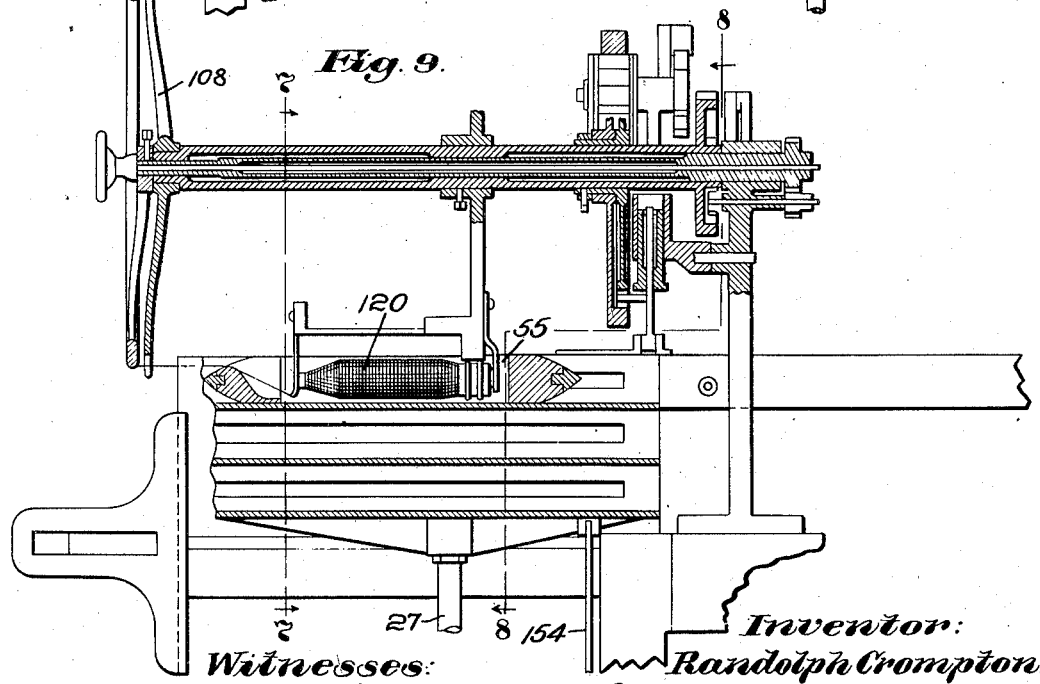

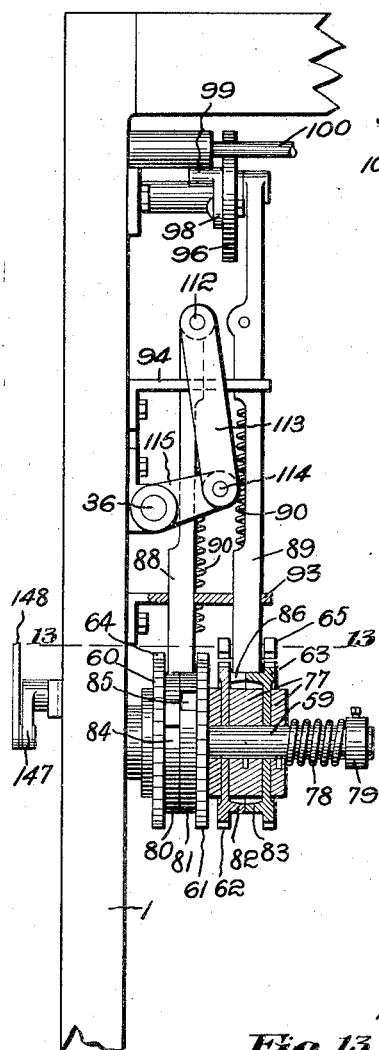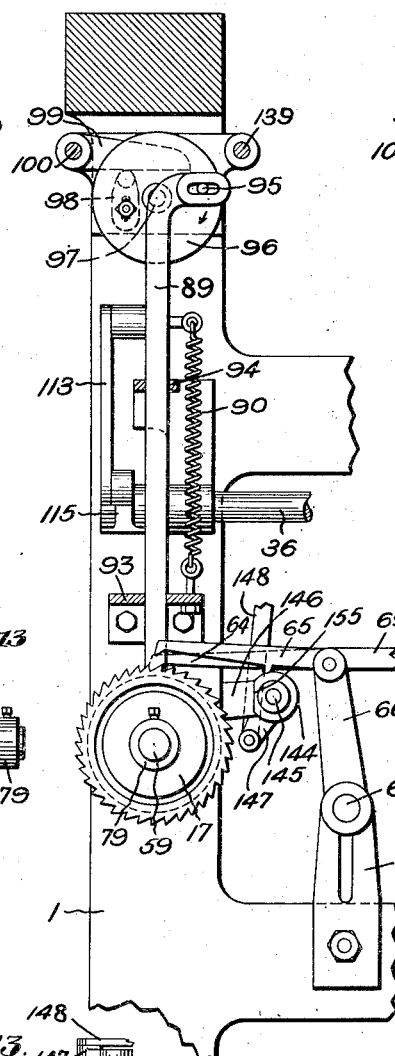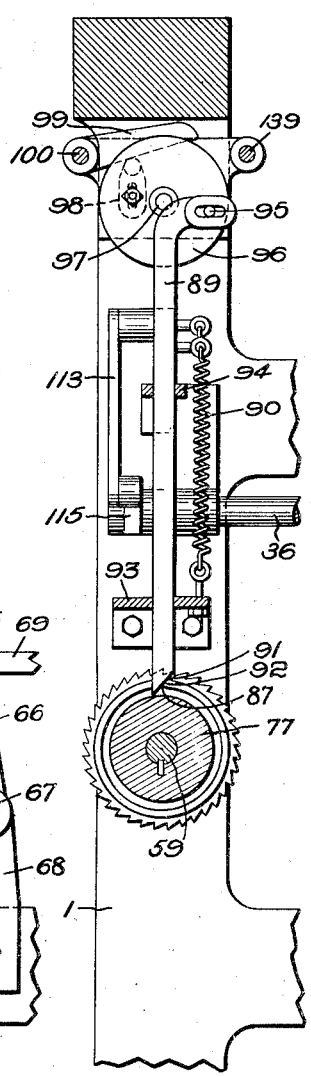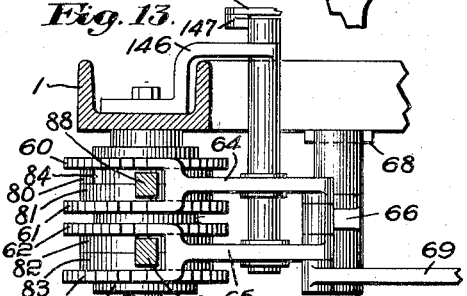

R. CROMPTON.
FILLING REPLENISHING MECHANISM FOR LOOMS.
APPLICATION FILED FEB. 21, 1914.

1,276,180.

Patented Aug. 20, 1918.
9 SHEETS—SHEET 9.

Witnesses:
Horace A. Crosman
Carl L. Choate

Inventor:
Randolph Crompton.
by Emery, Booth, Janney & Varney
Attys.

UNITED STATES PATENT OFFICE.

RANDOLPH CROMPTON, OF CHATHAM, MASSACHUSETTS.

FILLING-REPLENISHING MECHANISM FOR LOOMS.

1,276,180.  Specification of Letters Patent.  Patented Aug. 20, 1918.

Application filed February 21, 1914. Serial No. 820,096.

*To all whom it may concern:*

Be it known that I, RANDOLPH CROMPTON, a citizen of the United States, and a resident of Chatham, in the county of Barnstable and State of Massachusetts, have invented an Improvement in Filling-Replenishing Mechanism for Looms, of which the following description, in connection with the accompanying drawings, is a specification, like characters on the drawings representing like parts.

This invention relates to filling replenishing mechanism for looms. It has for an important object thereof the provision of novel means for automatically supplying fresh filling carriers to the running shuttles when the filling carriers contained therein have become substantially exhausted or exhausted to a predetermined extent, or upon filling failure or breakage, and is particularly applicable to looms using a plurality of shuttles each carrying a distinctive filling carrier. Thus, in accordance with my invention replenishment occurs upon any one of four contingencies which I group under the designation of filling fault in a running shuttle.

In order that the principle of the invention may be readily understood, I have disclosed a single embodiment thereof in the accompanying drawings, wherein Figure 1 is a front elevation of a replenishing loom embodying my invention;

Fig. 2 is an end elevation of the loom viewing the same from the left;

Fig. 2ª is a detail in side elevation of certain pawl controlling mechanism;

Fig. 3 is a front elevation of the left-hand end of the loom;

Fig. 4 is a vertical transverse section of the loom on the line 4—4 of Fig. 1 and looking toward the left in said figure;

Fig. 5 is a view similar to Fig. 4 but representing only the lower part of the loom and showing the parts in different position from that represented in Fig. 4;

Fig. 6 is a vertical longitudinal section upon the line 6—6 of Fig. 5;

Fig. 7 is a vertical section on the line 7—7 of Fig. 9 and looking toward the right in said figure;

Fig. 8 is a similar view on the line 8—8 of Fig. 9 and looking toward the left in said figure;

Fig. 9 is a longitudinal vertical section taken through the replenishing mechanism at the left hand end of the loom;

Fig. 10 is a detail of the weft measuring mechanism, partially in front elevation and partially in vertical section;

Fig. 11 is a side elevation of the construction shown in Fig. 10, portions being in section;

Fig. 12 is a view similar to Fig. 11, but representing the parts differently positioned;

Fig. 13 is a transverse section on the line 13—13 of Fig. 10;

Figure 1:
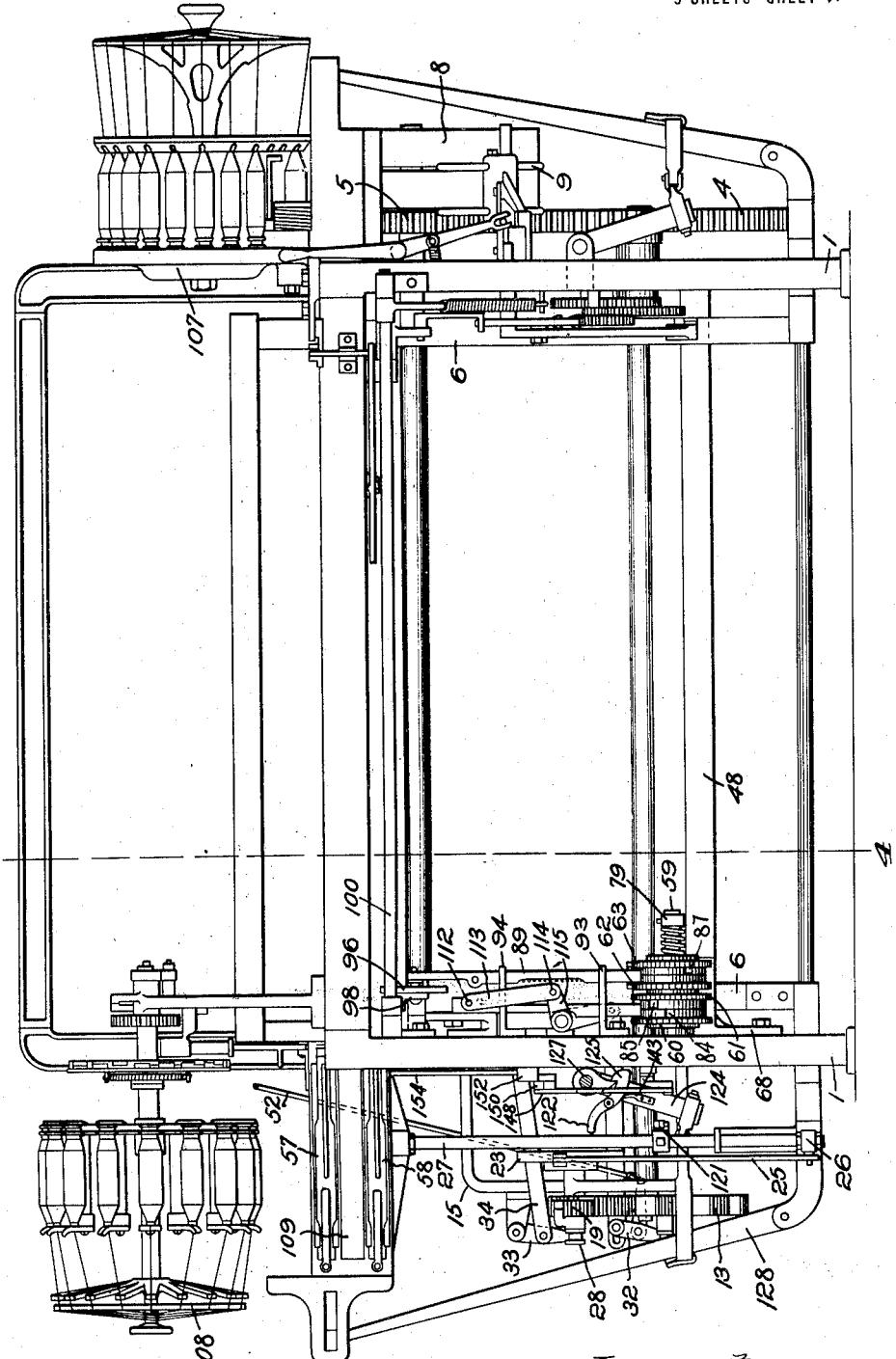

In accordance with my invention, replenishment may occur upon filling failure or breakage, or upon substantial exhaustion, or exhaustion to a predetermined extent. I have herein chosen to indicate replenishment as occurring upon exhaustion to a predetermined extent.

Any desired form of mechanism to indicate substantial exhaustion of the filling in the running shuttle may be employed, as for example a filling detector mechanism or a filling cutting off mechanism such as shown in my Patent No. 935,645, dated October 5, 1909. I have, however, herein illustrated measuring means to indicate a change of filling carriers when the filling carrier in the running shuttle has become exhausted to a predetermined extent, although as above stated I am in no wise limited thereto.

In the represented embodiment of my invention I have disclosed a loom having a magazine mounted adjacent to each end of the lay, there being a set of shifting shuttle boxes at one end of the lay, and a stationary or single shuttle box at the opposite end thereof. I may and prefer to use an ordinary self-threading shuttle such as is customarily used in the well-known Northrop looms and disclosed in the Northrop Patent, No. 529,940, dated November 27, 1894.

Inasmuch as in the disclosed embodiment of the invention I employ two magazines, one at each end of the lay, it is desirable to use self-threading shuttles of opposite hands. The pair of magazines mounted adjacent to the ends of the lay are herein so arranged as to receive the filling carriers in both instances with their butts toward the center of the loom. To accomplish this, I have used, in this embodiment of the invention, as above stated, right and left hand self-threading shuttles. When a change of filling carriers occurs at either end of the loom and when the shuttle is picked after replenishment has taken place, the filling will be drawn into the threading eye of the shuttle in the usual way, except in case of replenishment on the shifting shuttle box end of the loom where, as shown best in Fig. 9, the threading is accomplished simultaneously with transference. The two magazines, which, in the disclosed embodiment of the invention, are at the respective ends of the lay, together constitute filling supplying mechanism which, as hereinafter set forth, is under filling control to present fresh filling carriers one after another to complete exhaustion of the distinctive filling carriers of said filling supplying mechanism.

In combination with the filling supplying mechanism thus broadly expressed, I provide filling carrier replenishing mechanism for the carriers wound with distinctive filling including means to raise at least one of a plurality of shuttles at one side only of the loom from an operative position to an abnormal changing position.

The filling carriers may be bobbins or any other suitable supports.

Preferably and as herein disclosed, the magazine at one end of the loom is filled entirely with filling carriers all of the same distinctive character, while the magazine at the other end of the loom is filled with filling carriers of a different kind or character, but all the filling carriers in each magazine are, in the disclosed embodiment of the invention, wound with filling of the same distinctive character. This distinctive character may be and preferably is one of color, but is not necessarily such. When the shuttle having the right hand threading head has exhausted its carrier to the predetermined extent and needs replenishing, the magazine, which in the disclosed embodiment of the invention is of the well-known Northrop type, operates in the usual way after being set for a change of filling carrier by the measuring means, which latter, as previously stated, is preferably employed to indicate exhaustion of the filling to the predetermined extent. When the shuttle having the left hand threading head needs replenishing and after the measuring means has registered, owing to the exhaustion of the filling in that shuttle to the predetermined extent, the box motion, which operates the shifting shuttle box at the left hand end of the loom, is raised to a position above the highest position normally occurring during the ordinary shifting of the shuttles to form the check or pattern. In being lifted to this abnormal or heightened position through the instrumentality of the box motion, which in the present case is preferably of the well-known Crompton type, the filling carrier in the running shuttle, which occupies the top cell of the shifting shuttle boxes, is forced against a filling carrier in the magazine adjacent to this end of the loom when the lay is approximately in its forward position. This action causes the substitution of a new filling carrier, the picking motion being preferably suspended during this operation, and the magazine, as herein represented, turns two spaces during the backward motion of the lay and the lowering of the shuttle boxes.

As the magazine disclosed in this embodiment of the invention at the left hand end of the loom is arranged to contain fifteen holders for fifteen filling carriers, it is obvious that two complete revolutions of the magazine will cause all the filling carriers to be positioned for transference at this end of the lay.

The magazine at the plain or single shuttle box end of the lay is, in the disclosed embodiment of the invention, turned to the extent of one filling carrier at each movement and exhausts itself after one revolution, as is usual in all Northrop looms. Although the disclosed embodiment of my invention contains two magazines, one at each end of the lay, it is to be understood that I am not limited or restricted thereto, as within the broad scope and purpose of the invention the filling supplying mechanism may be variously positioned. Said two magazines together constitute one form or type of filling supplying mechanism adapted to contain filling carriers of distinctive or contrasting filling.

Figure 14:
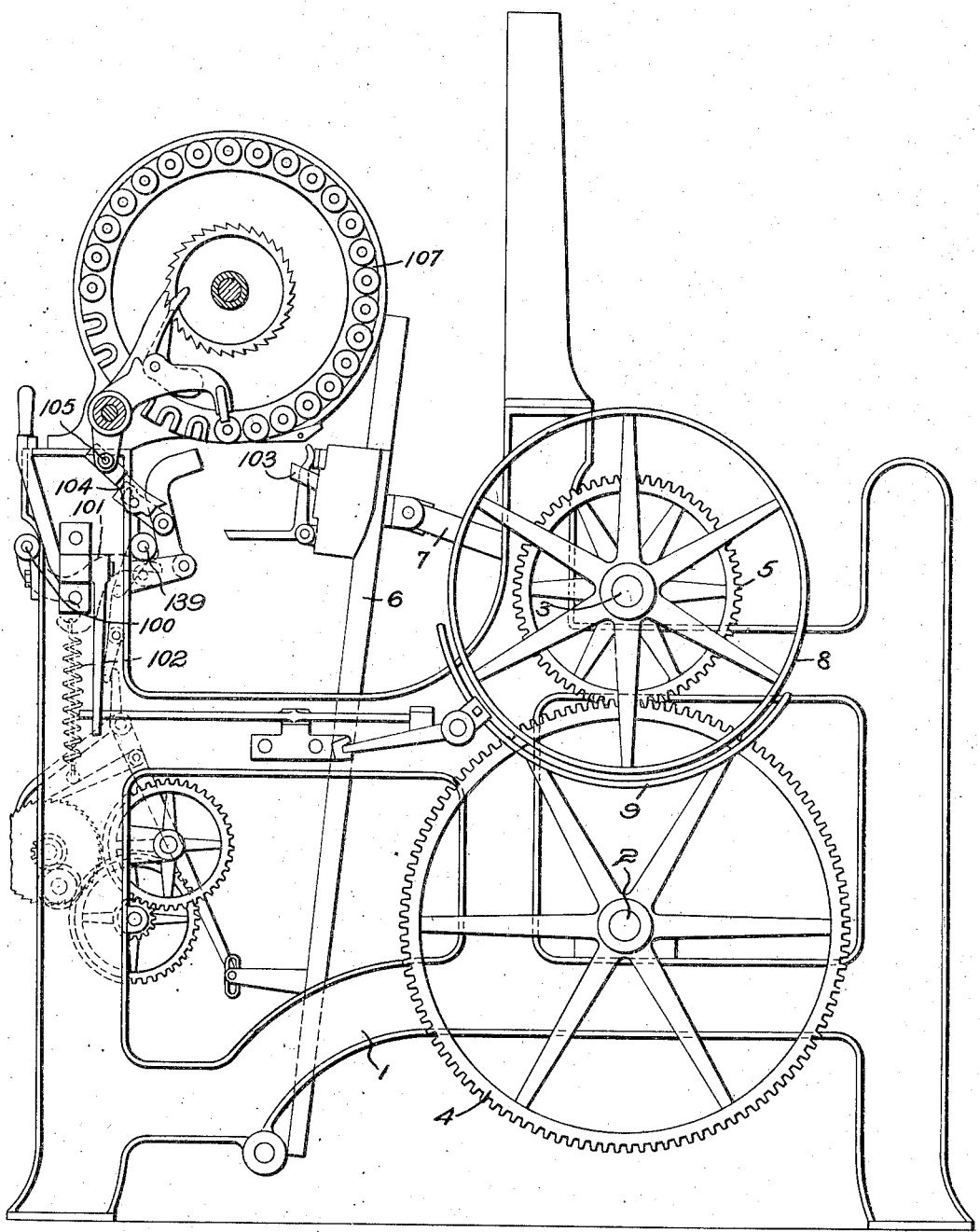
Fig. 14 is an end elevation of the right hand end of the loom.

Referring more particularly to the disclosed embodiment of the invention, the loom frame is indicated at 1 in the several figures. The cam shaft is indicated at 2 and the crank shaft at 3, the former having fast thereon a large gear 4 meshing with a smaller gear 5 fast upon the crank shaft. The lay, which may be of usual form, is indicated at 6, it being connected to the crank shaft in the usual manner as by connectors or links 7. Upon the crank shaft are mounted tight and loose pulleys in the usual manner, one of said pulleys being indicated at 8 in Fig. 14. A suitable belt shifter, such as indicated at 9 in said figure, may be employed and operated in any usual manner not herein necessary to describe.

The cam shaft 2, as most clearly shown in Fig. 2, has fast thereon an arm 10 provided with a pin or stud 11 adapted to engage intermittently each of a series of slots or sockets 12 in a mutilated master gear 13 which is mounted upon a stud 14 upon a suitable stand or bracket 15 secured to the loom frame. I provide suitable means coöperating with the master gear to control or determine the movement of the shifting shuttle boxes, thereby to effect not only their normal movements during the usual working of the loom, but also their abnormal movements to effect replenishment. While for this purpose I may employ any suitable mechanism, I preferably employ means coöperating with the said master gear 13 analogous to mechanism heretofore employed to control the shifting movement of a shuttle box in the normal running of the loom.

For that purpose, I have herein represented two studs 16, 17 suitably mounted in the loom frame and having fast thereon pinions 18, 19 meshing with and adapted to be actuated intermittently by the teeth of the master gear 13 when a change of shuttle boxes is desired. The lower or left hand stud 16, viewing Fig. 2, has fast thereon a disk 20 to which is eccentrically pivoted at 21 a link 22, the upper and opposite end of which is pivoted to the shuttle box lever 23, the construction being such that in the rotation of the pinion 18, the shuttle box lever 23 is rocked upon its pivot. The upper and right hand stud 17 is provided with an eccentric upon which the shuttle box lever 23 is pivotally mounted, the opposite end 24 of said shuttle box lever being connected in any suitable manner to the link 25 which at its lower end 26 is pivotally secured to the shuttle box rod 27, said links 25 being provided with a safety connection if desired and as therein illustrated.

Each of the pinions 18 and 19 is provided with a suitable forked hub 28, 29 (see Fig. 3) controlling the movement of sliding teeth 30, 31, which may be moved into and out of mesh with the teeth of the mutilated master gear 13. The said sliding hubs and teeth are operated in any suitable manner as by means of levers 32, 33 suitably mounted upon the loom frame.

The said lever 33 is preferably operated through the medium of a connecting rod 34 shown in Fig. 3, the opposite end of which is connected to one arm 35 of an elbow lever pivoted upon the shaft 36 shown in side elevation in Fig. 4. As shown most clearly in Figs. 2 and 4, the pattern surface 37 of any suitable type surrounds a pattern cylinder 38 having upon its inner end a ratchet wheel 39 engaged and adapted to be rotated by a pawl 40 which is pivoted upon a pawl carrier 41 itself pivotally mounted at 42 upon a suitable bracket. The opposite arm 43 of the pawl carrier is pivotally connected to an upright link or rod 44 which at its lower end is suitably attached to a lever 45 pivoted at 46 to a stand 47 upon the cross girt 48. The lever 45 is preferably provided with a weight 49 by which it is held in contact with a cam 50 fast upon the cam shaft 2.

The shifting or longitudinal movement of the connecting rod 34 by means of the rocking of the shaft 36 causes the lever 33 to move the sliding hub 28 so as to bring the sliding tooth 31 of the pinion 19 into and out of mesh with the teeth of the master gear 13.

As shown in Fig. 2, a finger 51 pivoted at 52' upon a bracket rising from the loom frame rests upon the pattern surface 37. To the outer end of said finger 51 is pivoted a link 52, the lower end whereof, as most clearly indicated in Fig. 3, is pivotally connected to a crank arm 53 which is itself pivoted at 54 co-axially with the lever 32, whereby the pattern surface 37 through the described connections shifts the hub 29 and sliding tooth 30 of the pinion 18 into and out of mesh with the teeth of the master gear 13 as called for by the requirements of the pattern. Upon movement of the sliding tooth 30 into mesh with the teeth of the master gear 13, the crank disk 21 is rotated and through the described connections the shuttle box lever 23 is rocked upon its pivot, thereby to shift the shuttle box rod 27 up and down as called for by the requirements of the pattern. The described shifting of the shuttle box rod 27 causes the shuttle boxes 55 and 56, and which are shown most clearly in Figs. 7 and 8, to be raised and lowered when required by the pattern surface. Each of said shuttle boxes, as represented in said figures, is provided with shuttle binders 57, 58 respectively.

It is unnecessary to describe in detail the shuttle box motion itself, as it is preferably of the well-known Crompton type.

The up and down shifting movement of the shuttle boxes in the normal operation of the loom is, as above described, effected through the instrumentality of the pattern mechanism acting to move the sliding tooth 30 into mesh with the master gear 13, and thereupon to rotate the pinion 18 without movement of the pinion 19. As will be hereinafter described, the simultaneous movement of the pinions 18, 19 results in the abnormal elevation of the shuttle boxes so as to effect replenishment at the shifting shuttle box end of the loom.

I have heretofore stated that any suitable means may be employed to be rendered active upon substantial exhaustion of the filling or exhaustion thereof to a predetermined extent, and that in the represented embodiment of the invention I have disclosed measuring means for the latter purpose and acting to count the picks made by each shuttle.

I shall now describe one type of measuring means which may be employed for this purpose, it being understood that other types of measuring means, or means rendered active upon substantial exhaustion of the filling, or other means rendered active upon exhaustion to a predetermined extent may be employed instead, although my invention is not in its broad aspects limited thereto.

Upon a suitable stud 59 mounted upon the loom frame, as shown most clearly in Figs. 4, 5 and 10 to 13 inclusive, are loosely mounted two pairs of ratchet wheels 60, 61, 62 and 63 which are respectively operated by forked pawls 64, 65 attached to the rocker arm 66 pivoted at 67 upon a suitable stand 68 bolted to the loom frame. The rocker arm 66 is adapted to be operated by a link or rod 69 which at its inner end is pivotally connected at 70 to one arm 71 of a bell crank lever pivoted upon a stud 72 mounted in a stand 73 upon the cross girt 48. The opposite arm 74 of said lever is provided with a weight 75 by which the arm 71 is held in constant engagement with a cam 76 fast upon the cam shaft 2, whereby upon rotation of said cam shaft the ratchets 60, 61, 62 and 63 are intermittently rotated. As stated, the ratchet wheels are arranged in two pairs and in the represented embodiment of the invention, one ratchet of each pair is preferably provided with thirty-six teeth and the other ratchet with thirty-seven teeth. The number of teeth should obviously be varied in accordance with the number of yards of filling wound upon each of the filling carriers. The ratchets 60, 61, 62 and 63 are mounted between suitable friction blocks, certain of which are indicated in section at 77 in Fig. 10, and which are restrained from rotation upon the stud 59 and are held in suitable frictional engagement with said ratchets by means of the coil spring 78 held in place by an adjustable collar 79 by which the tension of the spring and the consequent frictional engagement of the blocks with the ratchets may be increased or diminished.

Each of said ratchet wheels has upon its inner face a flange respectively indicated at 80, 81, 82 and 83, and each flange has therein an opening 84, 85, 86 and 87 (the opening 87 not being visible in Fig. 10). Each of said openings is less than one half the width of the lower end portion of the legs 88, 89, which as represented most clearly in Fig. 10 rest upon said flanges. The pairs of openings 84, 85 and 86, 87 when the loom is started are not in register, and the legs 88, 89 are consequently supported by the respective flanges of the ratchet wheels and cannot enter the openings until those pertaining to each leg come into register thereunder. The said openings will not register until after the ratchet wheels 60, 61, 62 and 63 have been rotated by their respective pawls 64, 65 the required number of times, which, in the present instance, is 1332 times; that is the multiple of the teeth in each set of ratchets. The said ratchet wheels are moved one tooth at every other pick. The openings in the flanges will therefore not register in the disclosed embodiment of the invention until 2664 picks of filling have been laid in the shed. Obviously the number of picks which the measuring device can determine may be varied by the use of larger ratchet wheels having more numerous ratchet teeth or by the use of smaller ratchet wheels having less ratchet teeth.

A more detailed description of the operation of this mechanism is unnecessary, inasmuch as it is substantially disclosed in the patent granted to myself and another, No. 600,121, dated March 1, 1898.

After the determined number of picks has been wound off a carrier in either of the running shuttles, the leg 88 or 89, acting in conjunction with the ratchet wheels pertaining to that particular shuttle, is forced down by a spring 90 into the openings which have been brought into register, and the leg remains therein until the cam shaft 2 is further rotated, whereupon the pawl 64 or 65 which operates the pair of ratchet wheels in question, cams or forces the leg out again into its normal position as before, and as will be evident from the construction shown in Fig. 12 wherein the lower end of each leg is represented as beveled at 91 and wherein the flanges of the ratchets are represented as provided with beveled portions 92.

Figure 16:
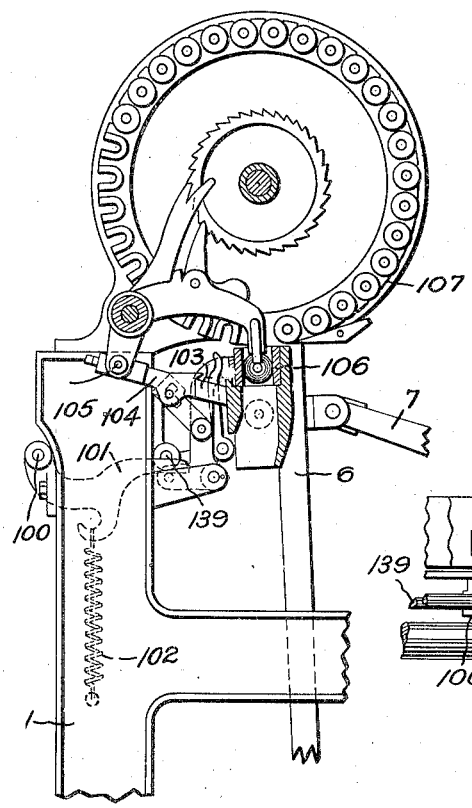
Fig. 16 is a detail in vertical section and end elevation of the replenishing mechanism at the right hand end of the loom.
Figure 15:
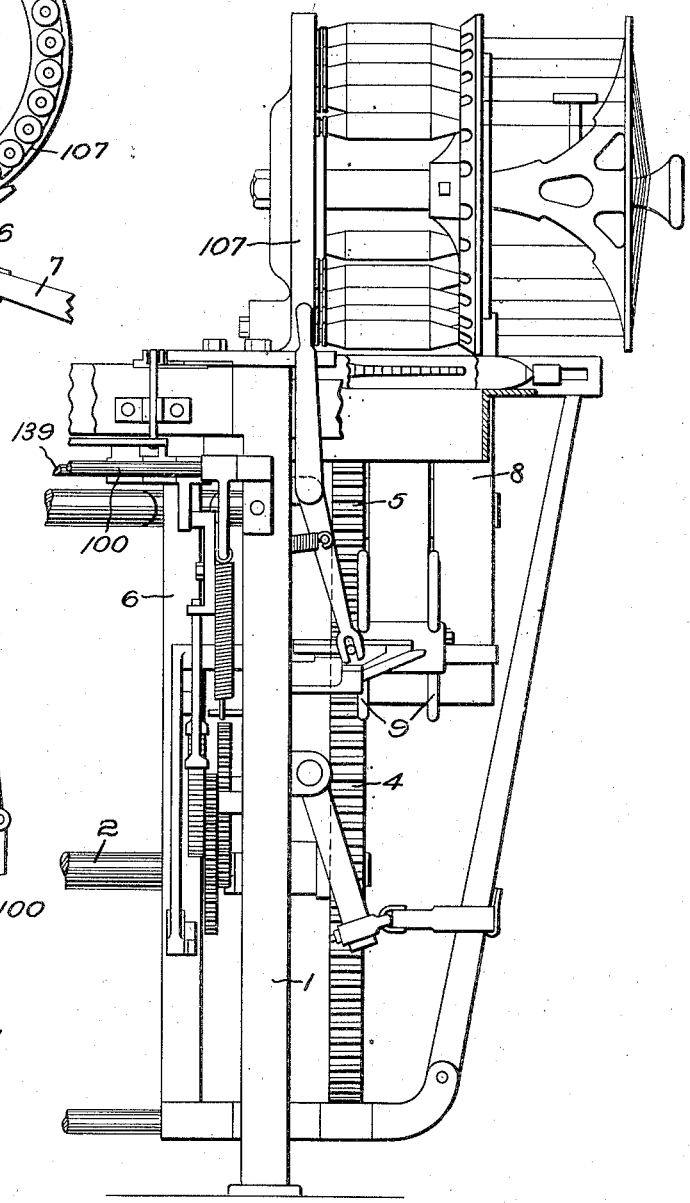
Fig. 15 is a front elevation of the right hand end portion of the loom.
Figure 17:
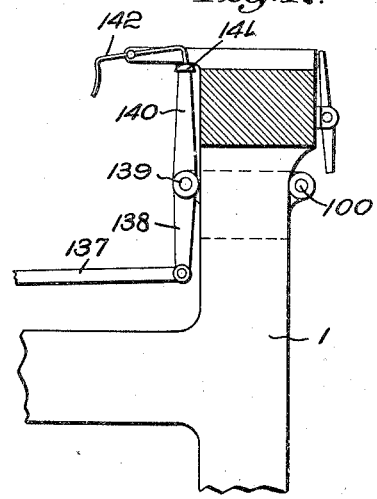
Fig. 17 is a detail representing the weft stopping mechanism.

The leg 89 is supported in suitable stands 93, 94 and at its upper end is connected by a slot and pin connection 95 with a disk 96 mounted upon a suitable stud 97 whereby upon each downward movement of the leg 89 the disk 96 is turned in the direction of the arrow thereon. Upon the said disk is mounted a suitable stud or projection 98 which takes under and is adapted to lift the lever arm 99 fast upon the shaft 100 represented also in Fig. 16. The said shaft 100 is suitably journaled in the loom frame and preferably extends across the front thereof from the measuring device end of the loom to the single box end thereof where it is provided with a bunter 101 shown in dotted lines in said Fig. 16, and which is normally held in depressed position by the coil spring 102. The said bunter 101 coöperates with a suitable replenishing mechanism co-acting with a single shuttle box and which in Figs. 15 and 16 is shown as of the so-called Northrop type. Obviously, however, any other suitable replenishing mechanism for a single shuttle box may be employed instead.

I have herein indicated the replenishing mechanism as of the so-called Northrop type, and it is unnecessary fully to describe the same in detail. As shown in said figure, the lay 6 is provided with a dagger 103 co-acting with a suitable bunter 104 mounted at 105 upon the replenishing arm in such manner as to be moved by the disclosed or any other suitable connecting means into and out of the path of the dagger 103, thereby to effect replenishment of the shuttle in the single box 106 in the usual manner upon the forward motion of the lay, whereby a filling carrier is transferred from the magazine 107 to the shuttle in a well-known manner.

At the shifting shuttle box end of the loom or left hand end, viewing Fig. 1, is mounted a magazine 108, shown most clearly in Figs. 7 and 8, preferably of the type shown in the patent granted to me, No. 935,645, dated October 5, 1909. Below the said magazine is mounted preferably in the usual manner the set of shifting shuttle boxes 55, 56 previously referred to. These shuttle boxes are herein represented as two in number, although obviously my invention is not restricted to an employment of such number of shuttle boxes, inasmuch as within the scope of my invention, a larger number of boxes may be employed. Between the said upper and lower boxes or cells 55 and 56, there is provided a space 109 preferably corresponding in size to an ordinary shuttle box and having an open side 110 through which a filling carrier, such as indicated at 111 in Figs. 7 and 8, may be discharged upon replenishment. The said space 109 is as represented without a binder and spring.

When a filling carrier in the left hand self-threading shuttle becomes exhausted to a predetermined extent as hereinbefore set forth, or upon filling breakage or failure, or practical exhaustion, if mechanism for that purpose be provided, as may be done within the scope of my invention, the ratchet wheels 60, 61 controlling this magazine have brought their openings 84, 85 into register or alinement, so that the leg 88 co-acting therewith enters the said openings, being forced downward by the co-acting spring 90, as previously stated. The leg 88, which is mounted for sliding movement in the brackets or guides 93, 94, is pivotally connected at its upper end 112, as shown in Figs. 3 and 10, to a link 113 pivoted at 114 to a lever arm 115 which is fast upon the rock shaft 36.

Therefore, in this embodiment of the invention, upon exhaustion to a predetermined extent of the filling in a filling carrier pertaining to the shifting shuttle box end of the loom, the shaft 36 is rocked sufficiently to rock the lever arm 35 and to move the connecting rod 34 inwardly toward the center of the loom, or in the direction of the arrow thereon, thereby through the sliding hub 28 to move the sliding tooth 31 into such position that it will be in mesh with the teeth of the master gear 13, as previously described. The shaft 36 has also fast thereon a downwardly extending arm 116 which at its lower end 117 is pivotally connected to a longitudinally movable connecting rod 118 pivotally connected at its outer slotted end to a lever 32, the lower end of which is connected to the sliding hub 29 controlling the movement of the sliding tooth 30 of the pinion 18, whereby the said sliding tooth is brought into mesh with the teeth of the master gear 13.

Thus in the disclosed embodiment of the invention, upon practical or predetermined exhaustion of a filling carrier pertaining to the shifting shuttle box end of the loom, the shaft 36 is rocked so as thereby to place the sliding teeth of both pinions 18 and 19 into line with or mesh with the teeth of the master gear 13.

Thereupon both of said pinions will be rotated and by reason of the fact that the pivot of the shuttle box lever 23 is eccentrically mounted, the shuttle box rod through the described connections will lift the shuttle boxes abnormally, and will place the lower shuttle box or cell 56 one space above the race of the lay instead of level with the race of the lay as heretofore, it being evident that the extent to which the shuttle-boxes are lifted may be varied in different types or embodiments of my invention. The shuttle box being abnormally positioned as desribed, the shuttle in the upper cell or box 55 is brought into contact with one of the filling carriers 120 held in the magazine at the left hand end of the loom as indicated in Fig. 7, whereupon the fresh filling carrier takes the place of the predeterminedly exhausted filling carrier, the latter being forced out through the open bottom of the shuttle box 55 into the open space 109 between the two boxes or cells 55, 56, thereby permitting said predeterminedly exhausted filling carrier to be discharged through the open side 110 thereof. From the foregoing description, it will be evident that the filling carriers contained in the magazines at the two ends of the lay are presented one after another to complete or substantially complete exhaustion of the filling carriers contained therein. The filling carriers in the magazine 107, shown in Figs. 15 and 16, are presented one after another, so that all said filling carriers are exhausted during one rotation of the said magazine, and the filling carriers in the magazine 108 at the opposite end of the lay are presented one after another, so that all said filling carriers are discharged from the magazine during two complete rotations of said magazine.

As most clearly shown in Figs. 1 and 3, the shuttle box rod 27 is provided with an adjustable stop 121, which when the rod is raised, strikes against one end of a lever 122 suitably pivoted at 123 upon the picking arm 124 and having at its other end a tooth or head 125 adapted normally to engage and upon the described movement of the lever 122 to be released from engagement with a finger 126 fast upon the shaft 127 of the picking arm 124. Thus, upon the upward movement of the shuttle box rod sufficiently to effect a change of filling carriers, the picking operation is suspended, the picking arm 124 being permitted to remain motionless upon the picking shaft. The picker stick 128 will therefore remain idle until the box rod 27 is returned to working position after the filling carrier has been transferred as described. Thus one pick is omitted at the left hand end of the loom.

The shaft 36, as most clearly shown in Figs. 4 and 5, is provided with an arched or curved portion 129 provided to clear the picking ball (omitted for the sake of clearness). The said curved portion 129 is provided with a projection 130 which when the shaft is turned moves outwardly under an adjustable stop 131 on the rod 44, the said rod in the ordinary running of the loom imparting movement to the pattern surface as previously described. The engagement of the projection 130 with the stop 131 arrests the operation of the rod 44, and therefore of the pattern surface, inasmuch as the lever 45 is thus held out of engagement with the cam 50.

The pattern surface controlling rod 44 remains stationary in its elevated position so long as the leg 88 remains depressed in the corresponding openings provided in the flanges of its ratchet wheels 60 and 61.

The rod 44, as shown in Figs. 4 and 5, is provided with an adjustable arm 132 to which is pivotally connected an arm 133 of a bell crank lever pivoted at 134 upon a bracket 135 upon the loom frame. The opposite arm 136 of said lever is pivotally connected to a connecting rod 137, which at its outer end is pivotally connected to a lever 138, itself pivoted upon shaft 139. Said shaft has fast thereon an arm 140 having a head 141 to take under and to rock the weft fork 142, thus suspending the loom stopping function of the latter.

The weft fork hammer operates in conjunction with the weft fork and slide to stop the loom in the usual manner, and were not the operation of the weft hammer suspended through the medium of the described connections, the loom would be stopped because of the omission of one pick during the described replenishment. In the manner described the weft hammer is held inoperative during said omitted pick and the loom is therefore not stopped, but is kept in continuous operation without the picking of filling during one revolution of the cam shaft 2.

As previously set forth, the cam 76 on the cam shaft 2, through the connecting rod 69 operates the pawls 64, 65 and through the turning movement of the ratchets 60, 61 forces the leg 88 upwardly out of its openings in the flanges of its said ratchet wheels, owing to the described beveled edge of the said openings, such movement occurring upon the next forward motion of the pawls 64, 65 following the movement whereby the said openings were brought into register as above set forth. The leg 88 in resuming its normal position on the flanges of the ratchet wheel 60, 61 restores all the working parts to their normal position by reason of the return movement of rotation thereby imparted to the shaft 36. The shuttle boxes are thereby lowered into the position called for by the pattern surface just prior to the replenishing operation above described. The cam 76 for operating the ratchets 60, 61, 62, 63 is circumferentially adjustable upon the cam shaft 2, so that it may be set thereon as the exigencies of correct loom operation may require.

Simultaneously with the lowering of the shuttle boxes into running position, the picking operation is restored inasmuch as the adjustable stop 121 is withdrawn from engagement with the lever 122, the head 125 of said lever being restored to engagement with the finger 126 by means of a suitable spring 143.

The pawls 64 and 65 are located over a suitable pawl lifter or cam surface 144 shown most clearly in Figs. 2ª, 4 and 11. The said pawl lifter or cam surface is pivoted at 145 upon a stand or bracket 146 attached to the loom frame, as shown most clearly at the right of Fig. 2. Mounted coaxially with the pawl lifter 144 is a lever arm 147, the outer end of which is pivotally connected as shown in Figs. 2 and 2ª to the lower end of a link 148, the upper end whereof is pivotally connected at 149 to a lever 150 itself pivoted at 151 upon a bracket 152 upon the loom frame. The opposite end of the lever 150 is pivotally connected at 153 to a link 154 suitably connected either to the upper end of the box rod 27 or to the under side of the lower shuttle box as desired. The lifting movement of the shuttle box to effect replenishment at the left hand side of the loom causes the lever 150 to be swung upwardly upon its pivot and through the link 148 and lever arm 145 to turn the pawl lifter or cam surface 144 so as to withdraw the flattened surface 155 from beneath said pawls and thereby to lift the latter out of engagement with their respective ratchets 60, 61, 62, 63.

The continued upward action of the shuttle boxes turns the cam surface 144 until another flattened surface 156 is presented, thereby lowering the pawl 64 again into engagement with its respective ratchets as best indicated in Fig. 2ª. Thus on the next forward motion of the cam on the cam shaft 2, the leg 88 will be raised out of the index holes or openings 84, 85, and as previously stated, the shuttle boxes will be lowered as previously described.

As I believe myself to be the first to devise a loom having means adjacent to both ends of the lay to change for a fresh filling carrier a substantially exhausted filling carrier or one exhausted to a predetermined extent, or one the filling of which has failed or broken, and also to be the first to use or employ, in a loom operating a plurality of shuttles containing filling carriers differing in colors or other characteristics, filling supplying mechanism under filling control to present fresh filling carriers one after another to substantially complete exhaustion of the distinctive filling carriers of said filling supplying mechanism, and means to raise one of said shuttles from its operative position to an abnormal, changing position, to effect the substitution of a fresh filling carrier of the proper distinctive filling for said running shuttle, in place of the running filling carrier in said shuttle, I desire to claim both of these features broadly, however carried out. So far as I am aware, no one heretofore has ever, in a loom operating with a plurality of distinctive fillings, lifted a shuttle box or a shuttle to an abnormal, carrier-changing position, to effect a change of filling carriers in the said lifted shuttle.

In certain of the claims, I have used the term "practical exhaustion" to mean and to include both substantial exhaustion and exhaustion to a predetermined extent.

Having thus described one illustrative embodiment of my invention, I desire it to be understood that although specific terms are employed, they are used in a generic and descriptive sense and not for purposes of limitation, the scope of the invention being set forth in the following claims.

So far as I am aware, I am the first to provide a shifting shuttle box loom wherein different colors of weft are supplied as called for by the pattern, with means to present fresh filling carriers of the proper distinctive filling one after another to complete exhaustion of said distinctive filling carriers and including means to raise one of a plurality of shuttles at one side only of the loom from its operative position to an abnormal changing position; to effect at said side of the loom the substitution of a fresh filling carrier of the proper distinctive filling pertaining to said raised running shuttle in place of the running filling carrier in said shuttle. I, therefore, desire to claim the same broadly, inasmuch as many changes may be made within the scope of my invention, and as I may variously replenish the shuttles other than the one herein referred to as raised from said operative position to an abnormal changing position, and am not limited to the means herein shown, nor to such replenishment at the end of the lay opposite that where the shifting shuttle boxes are positioned.

Claims:

1. A loom comprising shifting shuttle boxes adapted to receive a plurality of shuttles containing filling carriers wound with distinctive fillings, a lay, two devices adjacent opposite ends of the lay to hold in reserve fresh filling carriers, means to lift said shifting shuttle boxes, thereby to bring one of the shuttles contained therein to one of said holding devices, to cause a fresh filling carrier contained in said device to be transferred into said shuttle and to effect the discharge of the exhausted filling carrier from said shifting shuttle boxes, and means to cause a fresh filling package to be transferred from the other of said holding devices to running position in the loom.

2. A loom employing a plurality of shuttles each containing a filling carrier wound with filling of a distinctive character, and comprising means to bring into operation any one of said shuttles, a lay, a magazine adapted to contain a supply of filling carriers adjacent each end of the lay, and means operative upon practical exhaustion of the filling carrier in one of said shuttles to cause a filling carrier to be transferred from one of said magazines into one of said shuttles.

3. A loom employing a plurality of shuttles each containing a filling carrier wound with filling of a distinctive character and comprising a lay, a series of shifting shuttle boxes at one end of the lay, a shuttle box at the other end of the lay, a magazine adapted to contain a supply of filling carriers adjacent each end of the lay, and means operative upon practical exhaustion of a filling carrier in a shuttle at either end of the lay to cause a filling carrier to be transferred from one of said magazines into one of the series of shifting shuttle boxes or into the opposite shuttle box, according to the location of the substantially exhausted shuttle.

4. A loom employing a plurality of shuttles each containing a filling carrier wound with filling of a distinctive character and comprising a lay, a series of shifting shuttle boxes at one end of the lay, a shuttle box at the other end of the lay, a magazine adapted to contain a supply of filling carriers adjacent each end of the lay, and means co-acting with each of said magazines to cause a filling carrier to be transferred into a shuttle in the shuttle box adjacent thereto.

5. A loom employing a plurality of shuttles each containing a filling carrier wound with filling of a distinctive character and comprising a lay, a series of shifting shuttle boxes at one end of the lay, a shuttle box at the other end of the lay, a magazine adapted to contain a supply of filling carriers adjacent each end of the lay, and means to cause a filling carrier to be transferred from one of said magazines into one of the series of shifting shuttle boxes or into the opposite shuttle box according to the location of the shuttle to be replenished.

6. A loom employing a plurality of shuttles each containing a filling carrier wound with filling of a distinctive character and comprising means to bring into operation any one of said shuttles, a lay, a magazine adapted to contain a supply of filling carriers adjacent each end of the lay, and means to cause a filling carrier to be transferred from either one of said magazines into the shuttle adjacent thereto that is to be replenished.

7. A loom employing a plurality of shuttles each containing a filling carrier wound with filling of a distinctive character, and comprising means to bring into operation any one of said shuttles, a lay, a magazine adapted to contain a supply of filling carriers adjacent each end of the lay, and means co-acting with each of said magazines to cause a filling carrier to be transferred into a shuttle to be replenished, from that one of said magazines adjacent to the shuttle box containing said shuttle.

8. A loom employing a plurality of shuttles each containing a filling carrier wound with filling of a distinctive character, and comprising a lay, a series of shifting shuttle boxes at one end of the lay, a shuttle box at the other end of the lay, a magazine adapted to contain a supply of filling carriers adjacent each end of the lay, and devices distinct from each other and co-acting respectively with the magazines to cause a filling carrier to be transferred therefrom into a shuttle to be replenished.

9. A loom employing right and left hand headed shuttles containing filling carriers respectively wound with filling of a distinctive character and comprising a lay, a series of shifting shuttle boxes at one end of the lay, a shuttle box at the other end of the lay, a magazine adapted to contain a supply of filling carriers adjacent each end of the lay, said magazines being respectively adapted to contain and to supply filling carriers for right and for left hand headed shuttles, and means operative upon practical exhaustion of a filling carrier in a shuttle at either end of the lay to cause a filling carrier to be transferred from one of said magazines into one of the series of shifting shuttle boxes or into the opposite shuttle box according to the location of the substantially exhausted shuttle.

10. A loom employing a plurality of shuttles each containing a filling carrier wound with filling of a distinctive character and comprising a lay, a series of shifting shuttle boxes at one end of the lay and having a blank space for discharge of a filling carrier, a shuttle box at the other end of the lay, a magazine adapted to contain a supply of filling carriers adjacent to each end of the lay, and means to cause a filling carrier to be transferred from one of said magazines into one of a series of shifting shuttle boxes or into the opposite shuttle box according to the location of the shuttle to be replenished.

11. A loom employing a plurality of shuttles, each containing a filling carrier wound with filling of a distinctive character and comprising a lay, a series of shifting shuttle boxes at one end of the lay and having a blank space between two of said boxes for the discharge of a filling carrier, a shuttle box at the other end of the lay, a magazine adapted to contain a supply of filling carriers adjacent each end of the lay, and means to cause a filling carrier to be transferred from one of said magazines into one of the series of shifting shuttle boxes or into the opposite shuttle box according to the location of the shuttle to be replenished.

12. A loom employing a plurality of shuttles each containing a filling carrier wound with filling of a distinctive character and comprising a lay, a series of shifting shuttle boxes at one end of the lay, a shuttle box at the other end of the lay, a magazine adapted to contain a supply of filling carriers adjacent each end of the lay, means to cause a filling carrier to be transferred from one of said magazines into one of the series of shifting shuttle boxes or into the opposite shuttle box according to the location of the shuttle to be replenished, and means to suspend the pick during transfer of a filling carrier.

13. A loom employing a plurality of shuttles each containing a filling carrier wound with filling of a distinctive character and comprising a lay, a series of shifting shuttle boxes at one end of the lay, a shuttle box at the other end of the lay, a magazine adapted to contain a supply of filling carriers adjacent each end of the lay, means to cause a filling carrier to be transferred from one of said magazines into one of the series of shifting shuttle boxes or into the opposite shuttle box according to the location of the shuttle to be replenished, a pattern surface controlling the movement of the shifting shuttle boxes during normal operation of the loom, and means to suspend action of the pattern surface during transfer of a filling carrier.

14. A loom employing a plurality of shuttles each containing a filling carrier wound with filling of a distinctive character and comprising a lay, a series of shifting shuttle boxes at one end of the lay, a shuttle box at the other end of the lay, a magazine adapted to contain a supply of filling carriers adjacent each end of the lay, means to cause a filling carrier to be transferred from one of said magazines into one of the series of shifting shuttle boxes or into the oppos shuttle box according to the location of the shuttle to be replenished, means to stop the loom in the event of weft breakage, and means to suspend action of said weft stopping mechanism during transfer of a filling carrier.

15. A loom employing a plurality of shuttles each containing a filling carrier wound with filling of a distinctive character and comprising a lay, a series of shifting shuttle boxes at one end of the lay, a shuttle box at the other end of the lay, a magazine adapted to contain a supply of filling carriers adjacent each end of the lay, weft measuring means to measure picked weft, and means to cause a filling carrier to be transferred from one of said magazines into one of the series of shifting shuttle boxes or into the opposite shifting shuttle box upon the picking of predetermined lengths of weft as indicated by said measuring mechanism.

16. A loom employing a plurality of shuttles each containing a filling carrier wound with filling of a distinctive character and comprising a lay, a series of shifting shuttle boxes at one end of the lay, a shuttle box at the other end of the lay, a magazine adapted to contain a supply of filling carriers adjacent each end of the lay, weft measuring means to measure picked weft, means to cause a filling carrier to be transferred from one of said magazines into one of the series of shifting shuttle boxes or into the opposite shifting shuttle box upon the picking of predetermined lengths of weft as indicated by said measuring mechanism, and means to suspend action of said weft measuring means during transfer of said filling carrier.

17. A loom comprising a lay, shifting shuttle boxes at one end of the lay and adapted to receive a plurality of shuttles containing filling carriers wound with distinctive fillings, a shuttle box at the opposite end of the lay, a device associated with the lay to hold in reserve a fresh filling carrier, and means to move said shifting shuttle boxes so as to bring one of the shuttles contained therein to said holding device, to cause a fresh filling carrier contained in said device to be transferred into said shuttle and to effect the discharge of the exhausted filling carrier from said shifting shuttle boxes.

18. A loom comprising shifting shuttle boxes adapted to receive a plurality of shuttles containing distinctive filling packages, a lay, two devices adjacent opposite ends of the lay to hold in reserve fresh filling packages, means to move said shifting shuttle boxes, thereby to bring one of said shuttles contained therein to one of said holding devices, to cause a fresh filling package contained therein to be transferred into the shuttle and to effect the discharge of the exhausted filling carrier from said shifting shuttle boxes and means to cause a fresh filling package to be transferred from the other of said holding devices to running position in the loom.

19. In a loom, a lay, a shuttle, two magazines respectively adjacent the two ends of the lay, and separate means to cause a fresh filling carrier to be transferred to a shuttle at either end of the lay from the magazine adjacent to such end.

20. In a loom, a lay, a magazine adjacent each end of the lay and separate means including right and left hand shuttles to cause a fresh filling carrier to be transferred at either end of the lay.

21. In a loom, a lay, a magazine adjacent each end of the lay, and separate means including right and left hand shuttles to cause a fresh filling carrier to be transferred to its respective shuttle of said shuttles at either end of the lay from the magazine adjacent such end.

22. In a loom, a lay, a shuttle, a magazine adjacent each end of the lay, and separate means to cause a fresh filling carrier to be transferred at either end of the lay including shifting shuttle boxes at one end of the lay coöperating with one of said magazines and a shuttle box at the opposite end of the lay to coöperate with the transferring means and the magazine at such opposite end of the lay.

23. A weft-replenishing color loom comprising in combination a lay, a set of shifting shuttle boxes at one end of the lay, a shuttle box at the opposite end of the lay, a set of shuttles, and means acting upon filling fault in a running shuttle to supply a filling carrier of the proper color to the running shuttle, said means including a system of magazines and operative connections therefrom to said ends of the lay to supply one of said shuttles with filling at one end of the lay upon filling fault, and to supply another of said shuttles with filling at the opposite end of the lay, upon filling fault.

In testimony whereof I have signed my name to this specification, in the presence of two subscribing witnesses.

RANDOLPH CROMPTON.

Witnesses:
CHARLES F. ALDRICH,
DOROTHA B. RICE.